UNITED STATES PATENT OFFICE.

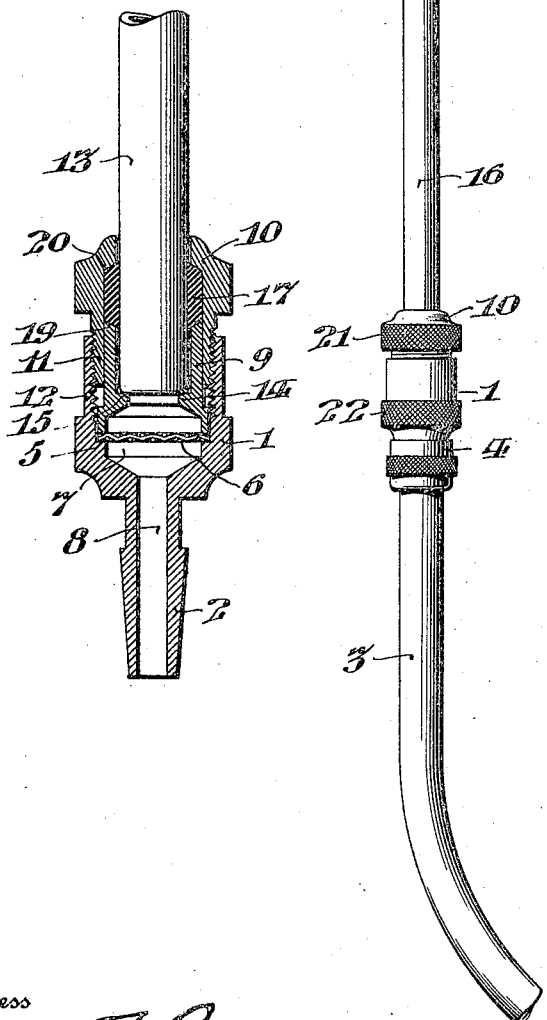

GEORGE D. HECK, OF PRINCE BAY, NEW YORK, ASSIGNOR TO THE S. S. WHITE DENTAL MANUFACTURING COMPANY, A CORPORATION OF PENNSYLVANIA.

SALIVA-EJECTOR.

1,353,587. Specification of Letters Patent. Patented Sept. 21, 1920.

Application filed February 20, 1917. Serial No. 149,717.

*To all whom it may concern:*

Be it known that I, GEORGE D. HECK, a citizen of the United States, and a resident of Prince Bay, in the county of Richmond, State of New York, have invented certain new and useful Improvements in Saliva-Ejectors, of which the following is a specification, reference being had to the accompanying drawings.

My invention relates particularly to that class of devices employed by dentists for ejecting the surplus saliva from the patient's mouth while operating upon the teeth, and is especially directed to the connection between the mouthpiece and the tube which conveys the saliva therefrom.

The principal objects of my invention are, to provide a saliva-ejector with a connection which is of simple construction, efficient in its operation, and which is highly sanitary, being readily assembled and taken apart to facilitate the thorough cleansing of all of its parts.

Other objects of my invention are, to provide a saliva-ejector with a connection in which the several independently removable parts are rigidly held in place by the attaching of one of said parts with the casing of said connection.

Specifically stated, the form of my invention as hereinafter described comprehends a casing having a passageway obstructed by a foraminous diaphragm serving as a strainer, and a removable stuffing-box arranged to retain said strainer and having a gland adjustably connected with said casing to hold the removable parts together.

My invention also includes all of the various novel features of construction and arrangement as hereinafter more definitely specified.

In the accompanying drawings, Figure 1 is a side elevational view of a saliva-ejector constructed in accordance with my invention, showing the connection between the mouth-tube and the flexible conveyer; Fig. 2 is a central longitudinal sectional view of said connection, showing a fragment of the mouth tube in elevation for convenience of illustration; Fig. 3 is a perspective view of the inner member or body of the stuffing-box; and Fig. 4 is a plan view of the strainer, which is arranged to be disposed within the casing of the connection between the mouth-tube and flexible conveyer, as shown in Fig. 2.

In said figures, the casing 1 of the connection is provided with the nipple 2, to which the flexible conveyer tube 3 may be attached by the ferrule 4. Said casing 1 is provided with the shoulder 5, against which the strainer 6 is seated within the enlarged cavity 7 of the passageway 8, and retained therein by the inner member or body 9 of the stuffing-box, which comprises said body 9 and gland 10. The inner cylindrical flange 11 of the gland 10 is threaded exteriorly to engage the interior threads on the cylindrical flange 12 of the casing 1.

The body 9 forms a sleeve for the mouth-tube 13 and is provided with an inwardly extended flange 14, providing a seat 15 for the inner end of said mouth-tube, which extends through the packing 17 disposed between the inclined opposed surfaces 19 and 20 of the stuffing-box body 9 and gland 10, respectively.

The parts above described may be conveniently assembled by placing the strainer 6 upon its seat 5 in the casing 1 and inserting the body 9 of the stuffing-box, which is arranged to retain said strainer 6 in position, then threading the gland 10 in engagement with the casing 1, and while loosely engaged therewith the mouth-tube 13 may be thrust through the packing 17 until its inner end engages the seat 15, whereupon the gland may be further adjusted to tighten the packing around the tube 13, and at the same time force the body or sleeve 9 against the strainer 6, and tightly engage it with its seat upon the shoulder 5.

It will be noted that by reason of the construction thus described the removal of the gland 10 from the casing 1 releases all of the parts of the connection, thereby enabling them to be readily cleansed and sterilized, the separation of the parts being facilitated by the knurled bands 21 and 22 respectively girdling the casing 1 and gland 10, which afford a firm hold for the fingers of the operator.

I do not desire to limit my invention to the precise details of construction and arrangement as herein set forth, as it is obvious that various modifications may be made therein without departing from the essential features of my invention as defined by the appended claims.

Having thus described my invention, I claim:

1. In a saliva-ejector having a mouthpiece, the combination with a casing having a seat, of a strainer, and a stuffing-box for said mouthpiece comprising a removable sleeve having a seat forming a stop for said mouthpiece packing, and a gland adjustably connected with said casing and arranged to force said sleeve into engagement with said strainer and yieldingly hold it upon the seat in said casing.

2. A saliva-ejector having a mouthpiece provided with a connection comprising a casing having a seat, a strainer on said seat, a stuffing-box body engaging said strainer with said seat, a gland in threaded engagement with said casing adjustable to force said body into engagement with said strainer, the parts being so assembled that the removal of said gland effects the release of all of said parts.

In witness whereof, I have hereunto set my hand this 15th day of February, A. D., 1917.

GEORGE D. HECK.

Witnesses:
Wm. H. David,
Warren H. Barton.